(12) United States Patent
Sudhakar

(10) Patent No.: US 8,080,597 B2
(45) Date of Patent: Dec. 20, 2011

(54) COMPOSITION AND A PROCESS THEREOF

(75) Inventor: Ashok Em Sudhakar, Las Vegas, NV (US)

(73) Assignee: Jayn International Pte. Ltd., Singapore (SG)

( * ) Notice: Subject to any disclaimer, the term of this patent is extended or adjusted under 35 U.S.C. 154(b) by 0 days.

(21) Appl. No.: 12/617,092

(22) Filed: Nov. 12, 2009

(65) Prior Publication Data

US 2011/0112225 A1 May 12, 2011

(51) Int. Cl.
*C08L 95/00* (2006.01)
(52) U.S. Cl. ............ 524/64; 524/65; 524/426; 524/451; 524/445
(58) Field of Classification Search ............... 524/64, 524/65, 426, 451, 445
See application file for complete search history.

(56) References Cited

U.S. PATENT DOCUMENTS

| | | |
|---|---|---|
| 5,223,031 A | 6/1993 | Sugi et al. |
| 5,928,418 A | 7/1999 | Tamaki et al. |
| 7,134,806 B2 | 11/2006 | Lazic |
| 7,226,501 B2 | 6/2007 | Thorstensson et al. |
| 2009/0275677 A1 * | 11/2009 | Savin .............................. 523/219 |
| 2010/0168274 A1 * | 7/2010 | Coe ................................ 523/204 |

FOREIGN PATENT DOCUMENTS

EP 1 956 050 A1 8/2008

* cited by examiner

*Primary Examiner* — Robert D. Harlan
(74) *Attorney, Agent, or Firm* — Fenwick & West LLP

(57) ABSTRACT

The present invention provides solution to the problems involved in construction of roads which are economical and which have longer life and low maintenance requirement. It provides a crack free, skid resistant and ravel free road. Also, the invention provides a process for the construction of road which is capable of addressing the problems of prior art.

16 Claims, 3 Drawing Sheets

COMPOSITION AND A PROCESS THEREOF

FIELD OF THE INVENTION

Figure 1:
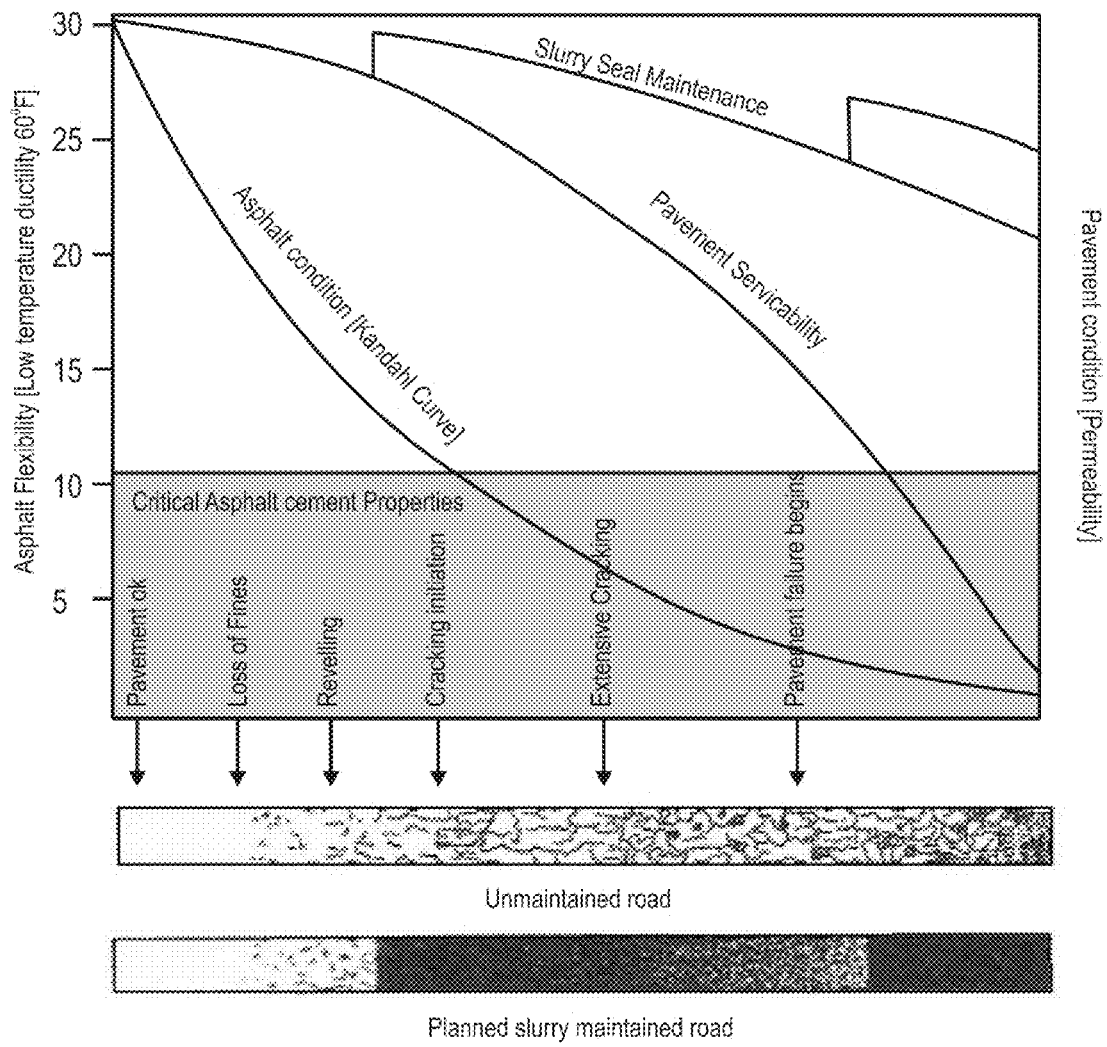

The present invention relates to construction of road, more particularly relates to a composition for constructing the road which is a crack free, skid resistant and ravel free road.

BACKGROUND AND PRIOR ART OF THE INVENTION

Pavement sections, such as concrete slabs and roadways usually undergo thermal movement, expansion and contraction, in response to ambient temperature changes and water permeated soil conditions. The gaps widen and narrow due to thermal movement of the pavement sections, which causes cracks to form in the road surfacing material. The underlying pavement deteriorates quickly, especially in areas where water penetrates through cracks in the asphalt.

Knowing these problems associated in prior art there is a need to provide a solution to the problems explained above. The present invention provides a composition for constructing road, a process to prepare such composition, a process to construct road which is crack free, skid resistant and ravel free road.

The product of instant invention is a low cost and quick way to develop infrastructure in villages and throughout the country. They are constructed in few hours. The constructed roads are aesthetic and structurally improved when compared with existing roads in and around the world. The construction is a low cost maintenance product for existing roads and highways. The composition of instant invention is termed as Z-course.

One way to improve is to provide for a cement/asphalt mixtures and processes for preparation provided by U.S. Pat. No. 5,223,031, wherein the said application provides for cement asphalt mixture to be applied at room temperatures and an improvement to existing cement/asphalt mixtures and used mainly for base courses. The Z course is a thin mixture of rubberized emulsion, aggregate, water and fly ash and is a sacrificial wearing course intended to protect the underlying base course. Another U.S. Pat. No. 5,928,418 application provides for an asphalt emulsion is an asphalt anionic emulsion. The Z course is more than emulsion and is a cationic process. Yet another way provided by EP 1956050 is bituminous composition for road construction for binders which is not a sacrificial wearing surface as that of instant invention. Yet another application U.S. Pat. No. 7,226,501 provides for aqueous quick setting bitumen aggregate mix suitable for cold pavement of roads, parking places, sidewalks and is not Z course of sacrificial wearing course. Yet another application U.S. Pat. No. 7,134,806 provides for a method and apparatus for road maintenance (equipment) for slurries etc whereas the Z course as provided in the instant invention is a product and not equipment.

The Z course uses rubber, fly ash and uses a cationic emulsion to yield the useful properties explained in the detailed description. The materials which constitute Z course have been around for long time—water, aggregate (crushed rock) asphalt, cement, cationic chemistry rubberized asphalt.

The novelty and inventiveness is development of the process (combination) and application (for road maintenance) in the proportions of these commonly used materials for a much needed product—it is "green" (helps the environment) costs half as much and lasts twice as long as the traditional methods.

The sacrificial wearing course—Z course is designed to protect the underlying asset the base course. (Z course is not a base course) Base courses are very expensive and use lot of asphalt in various courses.

Z course also uses less fossils fuels—oil; contributing to less depletion of natural resources and provides a contribution towards lessening of green houses gases, because the traffic can be opened quickly no "idling" by cars.

OBJECTIVES OF THE PRESENT INVENTION

First objective of the present invention is to provide a composition for construction of road having enhanced crack free, skid resistant and ravel free road.

Yet another objective of the present invention is to provide a process for preparation of composition for construction of road.

Still another objective of the present invention is to provide a process for construction of road.

STATEMENT OF THE INVENTION

Accordingly, the present invention provides a composition comprising aggregate, cationic rubberized emulsion, crumb rubber and fillers; a process for preparation of composition comprising of aggregate, cationic rubberized emulsion, crumb rubber and fillers, said process comprising acts of heating and agitating the crumb rubber to obtain a mass; emulsifying the mass with water to obtain an emulsion; and blending the emulsion with the aggregate, the cationic rubberized emulsion and the fillers to obtain the composition; a process to construct road, said process comprising acts of; preparing composition comprising of aggregate, cationic rubberized emulsion, crumb rubber and fillers; and spreading the prepared composition over pavement surface to construct a road; and A crack free, skid resistance and ravel free road constructed using composition comprising aggregate, cationic rubberized emulsion, crumb rubber and fillers.

BRIEF DESCRIPTION OF THE ACCOMPANYING DRAWINGS

Figure 2:
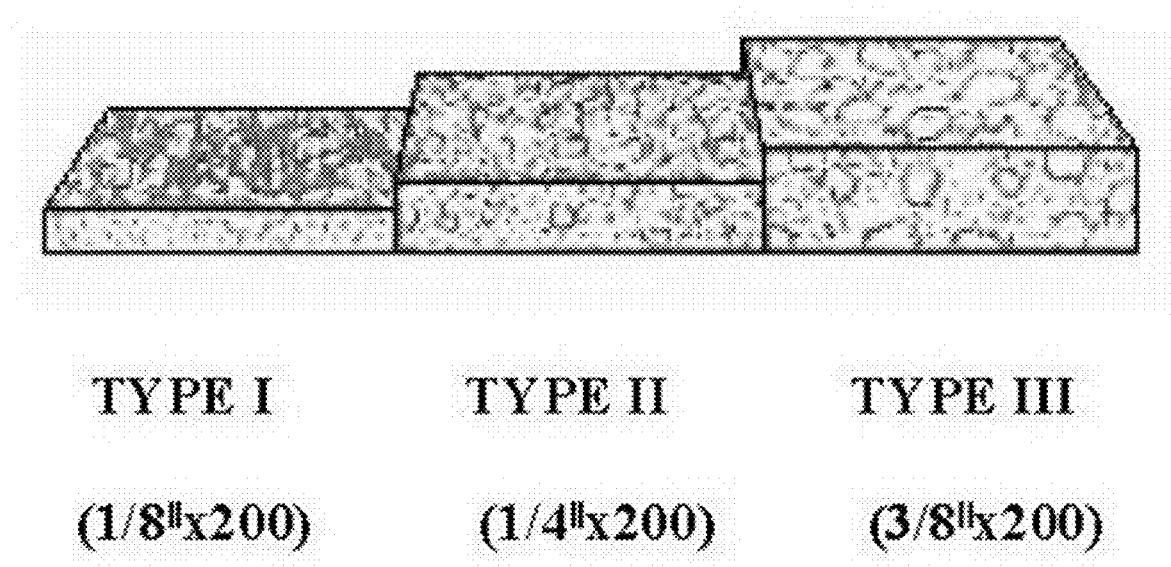
Figure 3:
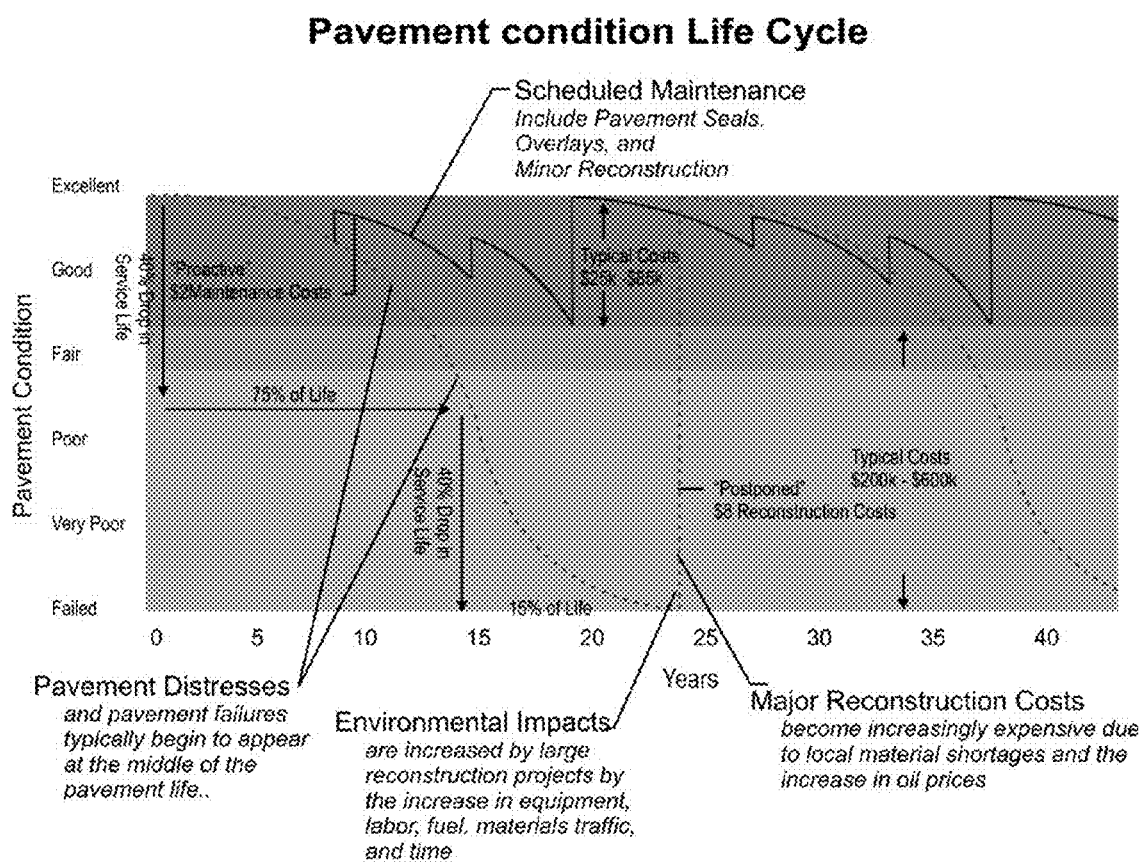

FIG. 1 shows pavement performance histograph;
FIG. 2 shows aggregate gradation showing three types of aggregates;
FIG. 3 shows pavement condition life cycle.

DETAILED DESCRIPTION OF THE INVENTION

The present invention is in relation to a composition comprising aggregate, cationic rubberized emulsion, crumb rubber and fillers.

In another embodiment of the present invention said cationic rubberized emulsion is present at a concentration ranging from about 10% w/w to about 25% w/w of aggregate, crumb rubber at a concentration ranging from about 3% w/w to about 15% w/w of aggregate, fillers at a concentration ranging from about 0.1% w/w to about 1.0% w/w of aggregate.

In yet another embodiment of the present invention said aggregate has size ranging from about 5 mm grade minus and 9.5 mm minus grade.

In still another embodiment of the present invention said cationic rubberized emulsion comprises asphalt at concentration ranging from about 80% w/w to about 90% w/w, oil at a concentration of 1.0% to about 10%, rubber at a concentration ranging from 3% w/w to about 15%, water at concentration ranging from about 30% w/w to about 40% w/w and surfactant at concentration ranging from about 0.2% w/w to about 2.0% w/w.

In still another embodiment of the present invention said crumb rubber is selected from a group comprising natural rubber, synthetic rubber and combinations thereof.

In still another embodiment of the present invention said crumb rubber is present at a concentration of about 7.5% w/w of aggregate.

In still another embodiment of the present invention said fillers are selected from a group comprising type I/II modified Portland cement, hydrated lime, Type F Fly-ash, aluminum sulfate and combinations thereof.

In still another embodiment of the present invention the Fly-ash concentration is ranging from about 0.1% w/w to about 1.0% w/w of aggregate.

The present invention is in relation to a process for preparation of composition comprising of aggregate, cationic rubberized emulsion, crumb rubber and fillers, said process comprising acts of heating and agitating the crumb rubber to obtain a mass; emulsifying the mass with water to obtain an emulsion; and blending the emulsion with the aggregate, the cationic rubberized emulsion and the fillers to obtain the composition.

In yet another embodiment of the present invention said heating and agitating of the crumb rubber optionally along with oil is carried at a temperatures ranging from about 350 F to about 400 F for a time period ranging from about 1.5 hours to about 3 hours.

In yet another embodiment of the present invention emulsifying of the mass with water is carried-out at a temperature 100 F to 210 F.

The present invention is in relation to a process to construct road, said process comprising acts of; preparing composition comprising of aggregate, cationic rubberized emulsion, crumb rubber and fillers; and spreading the prepared composition over pavement surface to construct a road.

In yet another embodiment of the present invention said composition is prepared by process comprising acts of heating and agitating the crumb rubber to obtain a mass; emulsifying the mass with water to obtain an emulsion; and blending the emulsion with the aggregate, the cationic rubberized emulsion and the fillers to obtain the composition.

In yet another embodiment of the present invention said composition comprises aggregate to provide crack penetration and sealing in traffic areas, corrects moderate-to-severe raveling, oxidation and loss of matrix, skid resistance, to prevent hydro-planning and provides skid resistance respectively.

A crack free, skid resistance and ravel free road constructed using composition comprising aggregate, cationic rubberized emulsion, crumb rubber and fillers.

The product of instant invention offers the following unique features:

Low cost: Economical to install, highly cost-effective to use.

Rapid usability: Easy, swift application of a new overlay makes the instant invention especially attractive for rehabilitating busy thoroughfares, parking lots and airport runways. The new surface is ready for use in just hours after application.

Preventing problems: Used over newly laid pavements, the product of instant invention will prevent surface distresses such as the effects of weathering from occurring. Oxidation, loss of oils, loss of matrix, and embitterment of the mix are minimized. It also provides special durability and texture not available in the underlying mix.

Correcting problems: Existing distresses in older pavements—surface cracking, raveling, loss of matrix, increased water and air permeability, and slipperiness due to flushing and aggregate polishing—can be corrected through usage of product of instant application. Waterproofing is also achieved, preventing further deterioration. An all-weather, long lasting surface is created that offers skid resistance and improved handling characteristics for drivers.

Aesthetic value: With one simple application, existing pavement receives a new wearing surface of uniform black color and texture. Enhanced appearance means increased property value, marketing potential and buyer acceptance. Thoroughfares, shopping center parking lots and other public or commercial pavements treated with product of instant invention become more attractive and eye-appealing.

The principal materials used to create product of instant invention are aggregate, asphalt emulsion; crumb rubber and filler, which are mixed together according to a laboratory's design-mix formula. Water is also added for workability.

Asphalt emulsions serve as a binder, holding the crushed aggregate together and to adhere the new Z-COURSE surfacing to the old surface over which it is being applied. Various emulsions and aggregates are used to meet the conditions, specifications and requirements of individual projects.

The aggregate must be clean, crushed, durable, properly graded, and uniform. The asphalt emulsion is a three-part system consisting of asphalt, water, and emulsifier. Fillers such as Portland cement, hydrated lime, or aluminum sulfate liquid are often used in small quantities as stabilizers or chemical modifiers.

The product of instant invention is made in specially designed equipment, either truck mounted or self-propelled. This equipment carries a quantity of unmixed materials which are blended together in a continuous flow pug mill. The use of this technologically advanced machinery insures a smooth, consistently uniform mixture.

The product is made quickly and accurately at the project site. Mixing and spreading are accomplished in one continuous operation, with the surface being reopened to travel within a few hours.

Mode of applying on surface: The composition is applied to an existing pavement surface by means of a spreader box linked to the mixing unit. The blended mixture is introduced into the spreader box, which then lays down the coating as the mixer/spreader is driven forward.

The box is capable of spreading the composition over the width of a traffic lane in a single pass and is constructed so that close contact with the existing surface is maintained. This insures uniform application of the new coating on a variety of configurations encompassing various crowd shapes, super elevated sections and shoulder slopes.

Trained operators continually monitor the automatic mixing procedure. Other personnel clean the surface before the applications, barricade the street, inspect the operation in progress for uniformity, clean metal utility covers after application, and complete the spreading in any area inaccessible to the spreader box.

Emulsions of varying composition and setting times are mixed with any one of three grades of aggregates to create composition mixes for specific purposes these types are:

i. Aggregate Type I (fine): Fine aggregate mixtures are used for maximum crack penetration and sealing in low-density/low-wear traffic areas.

ii. Aggregate Type II (general): Type II aggregates are the most commonly used and are widely employed where moderate-to heavy traffic is found. They seal, correct moderate-to-severe raveling, oxidation and loss of matrix, and improve skid resistance.

iii. Aggregate Type III (coarse): Corrects severe surface conditions—preventing hydroplaning and providing skid resistance under very heavy traffic loads.

The product of instant invention can be used for nearly any need or condition and can be custom designed to satisfy the most difficult requirements. The details of aggregate gradation are provided in FIG. 2.

Most types of composition ingredients can be mixed and applied by the same set of equipment, an average set of road constructing equipment consists of a minimum of two mixing trucks, sweeper or broom, emulsion tanker with tractor, wheel loader, flatbed supply truck and traffic control truck.

Equipment, if maintained properly, should last for approximately fifteen (15) years Crew for construction of road: The crews for constructing roads of instant invention are generally composed of eight to nine men, a Foreman, a Mixer Operator, two truck drivers, two squeegee men, two traffic control men and a sweeper operator. Most of these positions can be manned by common laborers and be trained one on one in the field in a few weeks. The mixer operators training will take a few months to perfect, do to its complexity.

Lane stripping: The simplistic way to stripe a roadway is by a push powered hand striper. A crew of five men could stripe an average of two miles of double yellow stripe per day. This crew would be comprised of three men laying out the stripe position, one man pushing the striper and one man loading the striper with paint.

Benefits of Pavement Maintenance

Even the best of surfaces are subject to the wear and tear caused by time, weather and traffic. No surface is permanent.

By undertaking a program of planned pavement maintenance, considerable savings in rehabilitation costs may be achieved. Your pavement surface' will remain sound, usable and safe. Extensive downtime needed to repair deep cracks and potholes will be reduced or eliminated.

The application of instant invention will significantly extend the life of existing pavements by protecting the undersurface from damage caused by water seepage. Improved surface performance is an added bonus.

A pavement maintenance program using instant invention will not only help to protect your pavement, it will help to protect your paving investment.

Pavement Performance Histograph [Graph Shows What Happens to Asphalt without Maintenance]

Pavement performance histograph is shown in FIG. 1 the product of instant invention dramatically extends pavement life. Although the serviceability of an untreated asphalt pavement is still adequate after several years of use, pavement deterioration has already begun.

The maintenance program undertaken before significant pavement deterioration has begun is essential to proper pavement maintenance.

The product of instant invention is called as "Z-Course".

The Z-Course Product/Process provides a renewable, flexible wearing surface incorporating processed and recycled rubber combined with a cationic emulsion and crushed aggregate. The cationic rubberized emulsion provides several advantages including the ability to control setting or curing times, permitting rapid placement and nearly immediate use by traffic.

The process is combined with crushed aggregate of various sizes to permit design of the product from locally available aggregate sources. The aggregate size selection also permits providing a finish surface consistent with travel speeds and volumes to provide improved skid resistance and surface smoothness.

| Material | Percentage by Weight |
|---|---|
| Z-Course Rubberized Cationic Emulsion* | 15% to 20% by weight of aggregate |
| Residual Asphalt/Rubber* | 7.5% minimum by weight of aggregate |
| Add Water* | 5% to 15% |
| Type F Flyash* | 0.1% to 1.0% |

Note:
*Specific proportions to be determined based on actual aggregate, water, Z-Course Emulsion and Flyash available at project site. Aluminum Sulfate and/or Type I/II Modified Portland Cement may be used where Type F Flyash is unavailable and depending upon site conditions.

The following specifications address general characteristics and performance of Z-Course. Specific proportions will be based on careful design using locally available aggregate, water and emulsion. Based on these criteria, the completed mixture may be localized to take full advantage of available materials.

Cationic Rubberized Emulsion Aggregate Wearing Surface

The Z-Course Product/Process provides a renewable, flexible wearing surface incorporating processed and recycled rubber combined with a cationic emulsion and crushed aggregate. The cationic rubberized emulsion provides several advantages including the ability to control setting or curing times, permitting rapid placement and nearly immediate use by traffic.

The process is combined with crushed aggregate of various sizes to permit design of the product from locally available aggregate sources. The aggregate size selection also permits providing a finish surface consistent with travel speeds and volumes to provide improved skid resistance and surface smoothness.

The specific combination of cationic emulsion, processed and recycled rubber aggregate and water is unique to each project and region depending upon the available aggregate and water sources. Specific samples of materials for each project are combined through a range of proportions to evaluate consistency, workability, curing or setting times, appearance and resistance to wear.

Based on developments of similar materials and previous designs for other regions the following ranges of materials are anticipated.

Cationic Rubberized Emulsion

Asphalt binders which may be utilized in Z-Course include any of the well known bituminous materials used heretofore in the paving art such as natural asphalts or those derived from petroleum refining, for example by vacuum distillation, solvent refining, steam refining with or without air blowing.

The asphalt for Z-course may be selected according to penetration grade asphalt binder specifications, AC specifications, AR specifications or PG specifications with or without polymer modification. Generally, Penetration Grades of 85-100 to 120-150, AC grades 2.5 to 40, AR grades 2000 to 8,000 and PG grades from 58 to 72 and −10 to −18 may be used in Z-Course.

The engineer shall select a suitable grade of asphalt binder based on a combination of climatic conditions, current and anticipated traffic weights and volumes, required construction times and required curing periods. A general rule would result in use of softer grades of binder in colder climates or during colder weather cycles coinciding with construction and harder grades in hotterclimates or when anticipated construction will occur during extremely warm or hot weather.

Z-course incorporates a rubber component, which may be natural rubber, synthetic rubber or some combination thereof. Use of ground or pulverized and sized reclaimed, vulcanized natural rubber and/or ground and sized devulcanized natural reclaimed rubber is preferred. Desired characteristics are obtained through optimum combinations of ground rubber within a range of 3% to 10% ground rubber by weight of the asphalt binder. The ground rubber shall be 95% passing the No. 20 mesh sieve and preferably 90% passing the No. 40 mesh sieve.

Suitable means shall be used to heat and agitate the various combined components of asphalt-rubber and extender oil (if used) at a temperature of 350 F to 400 F and to maintain a minimum temperature of 350 F for extended time periods prior to manufacture of Z-course. Paddles, augers or propellers shall provide typical agitation. All components will be added and mixed to a homogenous blend and the temperature maintained as required to ensure full blending prior to emulsifying the mixture. Typical mixing and blending times of up to 3 hours at a minimum temperature of 350 F is required. Blending time shall be modified as required depending upon the agitation and mixing process.

The combined materials shall then be emulsified with water as a final product prior to the additional of required aggregate filler. Care must be exercised during the emulsification process to ensure the final mixture temperature is less than 210 F. The specific proportions will be determined based on the mixture temperature, viscosity and temperature relationships and the handling characteristics. Viscosity testing such as the kinematic viscosity at 275 F may bye used to aid in selection, proportioning and mixing temperatures. The temperature of added water, emulsifier must be controlled to limit heating requirements of the completed rubberized asphalt binder. The emulsifier used to stabilize the emulsion shall be cationic sufficient to yield a final cationic emulsion.

Emulsification shall be accomplished in a colloid mill with the water, emulsifier and the rubberized binder passed between a rotor and stator of sufficiently small clearance to combine materials through extreme shear. The completed emulsion shall exhibit a uniform particle size based on the fixed clearance in the mill. Hydrochloric acid shall be added as required to maintain the proper particle charge during production and to maintain properties during shipping, handling and production of Z-Course.

The completed emulsion will be comprised of 40 percent plus or minus 10 percent by weight water. The completed emulsion shall include a minimum of 60% modified asphalt binder and shall meet the specific requirements for viscosity, particle charge and sieve test. The specific properties to be determined upon evaluation of the regionally available materials.

The emulsion shall be stable under normal storage conditions as determined through suitable storage stability testing. The rate of set of the cationic emulsion shall be controlled throughout the addition of a suitable setting agent such as but not limited to Type F Flyash, Aluminum Sulfate or Type I/II Modified Portland cement.

Aggregate

The aggregate used for the Z-course shall be clean and durable and be sized specially for the type of traffic utilizing the completed surface. The completed products will include use of several sized aggregates to address the need for skid resistance, riding qualities and aesthetics. Use of a finer aggregate size is anticipated for local roadways with light traffic volumes while use of larger aggregate size is anticipated for heavier use roadways and highways.

The specific aggregate gradation, resistance to wear, soundness and cleanliness requirements will be developed specific to regionally available aggregate sources. Presently anticipated material sizes include use of a 5 mm minus material and a 9.5 mm minus material.

Description of Material Proportions, Prosperities and Characteristics

Given the variability of aggregate sources, the specific proportions for the Z-Course will be region or source specific. Based on presently available and documented aggregate sources, a range of 15% to 25% emulsion blended with fine aggregate gradations and 10% to 20% emulsion for coarse aggregate material is anticipated.

The specific amount of water required in the mixture will be a function of the temperature at the time of placement, moisture in the aggregate used and placement techniques. A range of added water of 5% to 20% is currently anticipated.

The completed Z-course materials shall exhibit a resistance to wear when tested in accordance with ASTM D3910 except where larger aggregate sizes are included in the completed material, such larger sized materials shall also be included in the Wet Track Abrasion Test samples. The specific resistance to wear requirements will be project and region specific. Based on current developments in rubberized emulsion aggregate wearing surfaces, a maximum wear of 50 grams per square foot for fine aggregate materials and 60 grams per square foot for coarse aggregate materials is anticipated.

The specific proportions of rubber asphalt and oil (when used) will be based on development of desired physical characteristics. A concentration of ground rubber in the range of 5% to 15% may be anticipated. Prior to incorporation into the emulsion, the rubber shall be ground to a minimum of 90% passing the 40-mesh screen. Finer or larger materials may be considered where locally available and suitable Z-course characteristics may be maintained.

Establishing suitable final emulsion characteristics may require inclusion of oil extended products including but not limited to heavy aromatic petroleum fractions. Consideration may be given to additional oil stocks and products depending upon availability within the region.

The asphalt-rubber and/or asphalt-rubber blend with extender oil shall be heated and blended including suitable agitation. Agitation may be provided through use of auger or paddles. Mixing shall continue with or without extender oil to achieve a homogenous mixture prior to emulsification. Blending temperatures of 350 F to 400 F for a period of 1½ to 3 hours should be anticipated. The completed blend shall be permitted to cool to a maximum 300 F. The temperature of the water/emulsifier blend shall be controlled to ensure the combined temperature of blend and water/emulsifier shall not exceed 210 F following emulsification. The combined temperature of rubber blend and water/emulsifier shall not exceed 365 F.

The completed emulsion shall be produced in a colloid mill designed and operated to provide sufficient shearing action. The specific particle size following emulsification shall be determined consistent with the size of rubber particles used in the rubber blend. The emulsifying agent and hydrochloric acid used shall be selected and proportioned to result in a cationic asphalt-rubber emulsion (positive charge). Based on anticipated blend proportions, the completed emulsion shall be 50 to 60% solids although successful emulsions may include as low as 45% and as high as 65% solids.

Completed Z-Course

The completed Z-Course wearing layer shall be a combination of the rubberized emulsion and crushed rock dust from locally available sites, in propositions yielding a completed blend of rock dust, rubberized emulsion, add water for workability and use of fly ash for controlling the rate of set. The Z-course layer shall fill the existing pavement surface, replacing lost surface materials, moderate rutting and surface irregularities. The final surface is intended to provide a sacrificial wearing surface, including enhanced skid resistance, atheistic characteristics and general roadway improvement consistent with the surface transportation system.

The specific proportions of emulsion, rock dust, add water and fly ash shall be determined based on locally available aggregate. A range of sizes is anticipated including a coarse rock dust with a maximum size of ⅜" for heavily traveled roadways, ¼" for moderate farm to market roadways and ⅛" maximum for areas where traffic use is dominated by pedestrian use. The specific surface texture shall remain smooth, with slight changes in surface roughness to provide suitable skid resistance on higher speed roadways. The rate of set shall be controlled to permit traffic use in a minimum of ½ and maximum of 2 hours Based on the historical use, a completed mixture using 15% to 20% rubberized emulsion, 5% to 10% add water and 1% or less fly ash is anticipated. Actual proposition will vary with aggregate size and local aggregate characteristics.

The product of instant invention is a cationic rubberized slurry seal wearing surface. The base asphalt has crumb rubber added before the emulsion process with a percentage of carbon black. This product is designed to be a low cost alternative to conventional road maintenance as well as using recycled rubber to help the environment.

The product of instant invention is a very versatile product, and may be used in many applications such as for existing roads it can be a maintenance product to preserve the underlying asphalt and give a new wearing surface, for new construction when combined with applying composition over a compacted native material it is a much more cost effective alternative to conventional asphalt paving construction, and application of an asphalt rubber binder on the pavement or prepared surface followed by the application of crushed aggregate.

Pavement performance is the integrated interaction of the subgrade support, unbound layers, and various bound layers such as Bituminous Macadam, Dense Grade Bituminous Concrete, Semi-Dense Bituminous Concrete and Bituminous Concrete. The various layers provide support combined with serving as a smooth, rut resistant skid resistant wearing surface.

Performance of the completed roadway is determined by the effectiveness of the various layers to resist weather (hear, rainfall and drainage) fatigue from heavy vehicles (trucks and buses) and the daily wear and tear of traffic (automobiles, trucks. buses, cars, livestock). Adequate design balances the need for the support of the vehicle weights with the resistance to wear provided by the final surface Rubber modified wearing surface layers such as Z-course has proven to provide a cost effective of improving pavements throughout the world. Reuse of rubber products is also environmental friendly, resulting in measurable benefits to the wearing surface color, uniformity, crack resistance and long term wear characteristics.

Product of rubber modified wearing surfaces provides a balance between the need for serviceable roadways for effective delivery of goods and services, the need for cost effective, long term wearing surfaces, and includes a beneficial reuse of materials which would otherwise contribute to the world wide waste of used rubber Use of rubberized wearing surfaces such as Z-course provide a cost effective renewable wearing surface with numerous benefits
  Weatherproofing of Pavement Surface
  Seals minor pavement cracking
  Resists future cracking resulting from environmental conditions
  Promotes rapid surface drainage
  Protection of pavement edges through extension of Z-course layer
  Sacrificial Wearing Layer
  Predictable resistance to tire wear
  Predictable wear under various weather conditions
  Predictable Skid Resistance
  Aggregate size matched to traffic use and speeds
  Renewable friction surt~1 ce
  Fast Construction Schedules at Renewal Intervals of 5 to 7 Years
  Rapid production rates
  Rapid and controllable cure rates
  Compatible with Various Underlying Materials
  Previous pavement patching
  Previous crack fill
  Previous overlays and construction
  Blends Previous Patching and Repairs
  Uniform and long term improved appearance
  Improves and riding surface smoothness Maintenance of the Pavement Condition is paramount to long term, cost effective pavement performance. Where resurfacing is deferred, or resurfacing costs are excessive resulting in delays in resurfacing the pavement conditions deteriorate significantly requiring additional funding to rehabilitate the roadway versus maintaining the surface.

The cost savings through use of a specified wearing surface is apparent during initial construction and is realized as a result of protection of the roadway section from the effects of moisture. The long-term benefits are accentuated during subsequent applications of the wearing surface at costs ½ or less than placement of a Bituminous Concrete layer or overlay. The reduced thickness of the Z-Course layer also moderates build up of pavement and the resulting sharp grade differentials between the roadway and the unimproved shoulder region as shown in FIG. 3.

The invention has been described in connection with its preferred embodiments. However, it is not limited thereto. Changes, variations and modifications to the basic composition may be made without departing from the inventive concepts in this invention. In addition, these changes, variations and modifications would be obvious to those skilled in the art having the benefit of the foregoing teachings. All such changes, variations and modifications are intended to be within the scope of this invention. The technology of the instant application explained with the examples should not be construed to limit the scope of the invention.

I claim:

1. A composition comprising aggregate, cationic rubberized emulsion, crumb rubber and fillers.

2. The composition as claimed in claim 1, said cationic rubberized emulsion is present at a concentration ranging from about 10% w/w to about 25% w/w of aggregate, crumb rubber at a concentration ranging from about 3% w/w to about 15% w/w of aggregate, fillers at a concentration ranging from about 0.1% w/w to about 1.0% w/w of aggregate.

3. The composition as claimed in claim 1, wherein said aggregate has size ranging from about 5 mm grade minus and 9.5 mm minus grade.

4. The composition as claimed in claim 1, wherein said cationic rubberized emulsion comprises asphalt at concentration ranging from about 80% w/w to about 90% w/w, oil at a concentration of 1.0% to about 10%, rubber at a concentration ranging from 3% w/w to about 15%, water at concentration ranging from about 30% w/w to about 40% w/w and surfactant at concentration ranging from about 0.2% w/w to about 2.0% w/w.

5. The composition as claimed in claim 1, wherein said crumb rubber is selected from the group consisting of natural rubber, synthetic rubber and combinations thereof.

6. The composition as claimed in claim 5, wherein said crumb rubber is present at a concentration of about 7.5% w/w of aggregate.

7. The composition as claimed in claim 1, wherein said fillers are selected from the group consisting of type I/II modified portland cement, hydrated lime, Type F Fly-ash, aluminum sulfate and combinations thereof.

8. The composition as claimed in claim 7, wherein the Fly-ash concentration is ranging from about 0.1% w/ to about 1.0% w/w of aggregate.

9. A process for preparation of composition comprising of aggregate, cationic rubberized emulsion, crumb rubber and fillers, said process comprising acts of:
   a. heating and agitating the crumb rubber to obtain a mass;
   b. emulsifying the mass with water to obtain an emulsion; and
   c. blending the emulsion with the aggregate, the cationic rubberized emulsion and the fillers to obtain the composition.

10. The process as claimed in claim 9, wherein said heating and agitating of the crumb rubber optionally along with oil is carried at a temperatures ranging from about 350 F to about 400 F for a time period ranging from about 1.5 hours to about 3 hours.

11. The process as claimed in claim 9, wherein said emulsifying of the mass with water is carried-out at a temperature 100 F to 210 F.

12. A process to construct road, said process comprising acts of;
   a) preparing composition comprising of aggregate, cationic rubberized emulsion, crumb rubber and fillers; and
   b) spreading the prepared composition over pavement surface to construct a road.

13. The process as claimed in claim 12, wherein said composition is prepared by process comprising acts of heating and agitating the crumb rubber to obtain a mass; emulsifying the mass with water to obtain an emulsion; and blending the emulsion with the aggregate, the cationic rubberized emulsion and the fillers to obtain the composition.

14. The process as claimed in claim 12, wherein said composition comprises aggregate to provide crack penetration and sealing in traffic areas, corrects moderate-to-severe raveling, oxidation and loss of matrix, skid resistance, to prevent hydro-planning and provides skid resistance respectively.

15. A crack free, skid resistance and ravel free road constructed using composition comprising aggregate, cationic rubberized emulsion, crumb rubber and fillers.

16. The composition as claimed in claim 1, wherein said fillers are stabilizers.

* * * * *